(12) United States Patent
Rachitsky et al.

(10) Patent No.: US 11,462,125 B2
(45) Date of Patent: Oct. 4, 2022

(54) EMPIRICAL EXPERT DETERMINATION AND QUESTION ROUTING SYSTEM AND METHOD

(71) Applicant: Airbnb, Inc., San Francisco, CA (US)

(72) Inventors: Lenny Rachitsky, San Francisco, CA (US); Samuel Alan Haugh, San Francisco, CA (US); Nelson Aurel Gauthier, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 189 days.

(21) Appl. No.: 15/855,770

(22) Filed: Dec. 27, 2017

(65) Prior Publication Data
US 2018/0137772 A1 May 17, 2018

Related U.S. Application Data

(62) Division of application No. 14/382,128, filed as application No. PCT/US2013/028440 on Feb. 28, 2013, now Pat. No. 10,311,747.

(Continued)

(51) Int. Cl.
G09B 19/00 (2006.01)
G09B 7/00 (2006.01)
(Continued)

(52) U.S. Cl.
CPC ........... G09B 19/0061 (2013.01); G09B 7/00 (2013.01); H04L 67/10 (2013.01); H04W 4/021 (2013.01);
(Continued)

(58) Field of Classification Search
CPC ............................. G09B 19/0061; G09B 7/00
See application file for complete search history.

(56) References Cited

U.S. PATENT DOCUMENTS 9,292,667 B1 3/2016 Cabanero
10,311,747 B2 6/2019 Rachitsky et al.
(Continued)

FOREIGN PATENT DOCUMENTS

AU 2013225842 9/2014
CN 1475092 A 2/2004
(Continued)

OTHER PUBLICATIONS

Korean Office Action, Korean Patent Application No. 10-2014-7027287, dated Jan. 4, 2019, 13 pages.
(Continued)

Primary Examiner — Eddy Saint-Vil
(74) Attorney, Agent, or Firm — Schwegman Lundberg & Woessner, P.A.

(57) ABSTRACT

Systems and methods for empirical expert determination and question and answer routing are provided. They system collects location tracking data about each user and analyzes the location tracking data to empirically determine the level of expertise a particular user has for a specific venue/event or a specific geographic region at a particular scale on a map. The system receives questions about a specific venue/event or about a category of venue/event in a specific geographic region at a particular scale on a map and routes those questions in real time to one or more experts for the specific venue/event or the category of venue/event in the specific geographic region. The system receives a response to the question from at least one of the one or more experts and routes the response back to the requestor, also in real time. The system also efficiently represents the location of a plurality of venues/events and/or users within a specific geographic region on a displayed map at a plurality of scales of the map.

20 Claims, 6 Drawing Sheets

Related U.S. Application Data

(60) Provisional application No. 61/605,126, filed on Feb. 29, 2012.

(51) Int. Cl.
  *H04W 4/021* (2018.01)
  *H04W 4/21* (2018.01)
  *H04W 4/029* (2018.01)
  *H04L 67/10* (2022.01)
  *H04W 4/02* (2018.01)

(52) U.S. Cl.
  CPC ........... *H04W 4/027* (2013.01); *H04W 4/029* (2018.02); *H04W 4/21* (2018.02)

(56) References Cited

U.S. PATENT DOCUMENTS

| | | | |
|---|---|---|---|
| 2003/0140037 | A1 | 7/2003 | Deh-Lee |
| 2006/0178816 | A1* | 8/2006 | Dickin .................. G09B 29/10 |
| | | | 701/408 |
| 2006/0287810 | A1 | 12/2006 | Sadri et al. |
| 2008/0306826 | A1 | 12/2008 | Kramer et al. |
| 2009/0012953 | A1 | 1/2009 | Chu et al. |
| 2009/0106778 | A1* | 4/2009 | Pomeroy ................ H04L 41/12 |
| | | | 719/328 |
| 2009/0241040 | A1* | 9/2009 | Mattila ................. G06F 3/0481 |
| | | | 715/760 |
| 2009/0284551 | A1 | 11/2009 | Stanton |
| 2010/0041378 | A1 | 2/2010 | Aceves et al. |
| 2010/0070554 | A1 | 3/2010 | Richardson et al. |
| 2010/0153008 | A1* | 6/2010 | Schwartz ............... G06Q 30/02 |
| | | | 705/14.27 |
| 2010/0208028 | A1 | 8/2010 | Lauffer |
| 2010/0211308 | A1 | 8/2010 | Zheng et al. |
| 2010/0241723 | A1 | 9/2010 | Dornbush |
| 2012/0011167 | A1* | 1/2012 | Schmidt .............. G06F 16/9537 |
| | | | 707/802 |
| 2012/0095978 | A1 | 4/2012 | Levin et al. |
| 2012/0203732 | A1 | 8/2012 | Oono |
| 2013/0040654 | A1* | 2/2013 | Parish ................. H04L 63/0807 |
| | | | 455/456.1 |
| 2013/0060637 | A1* | 3/2013 | Walker ............... G06Q 30/0259 |
| | | | 705/14.58 |
| 2013/0095857 | A1 | 4/2013 | Garcia et al. |
| 2015/0017616 | A1 | 1/2015 | Rachitsky et al. |

FOREIGN PATENT DOCUMENTS

| | | |
|---|---|---|
| CN | 1950674 A | 4/2007 |
| CN | 101341373 A | 1/2009 |
| CN | 102047249 A | 5/2011 |
| CN | 104254865 | 12/2014 |
| CN | 107948928 | 4/2018 |
| CN | 107948928 | 4/2020 |
| EP | 2820616 | 1/2015 |
| EP | 2820616 | 4/2019 |
| EP | 3512221 | 7/2019 |
| IL | 234340 | 10/2017 |
| IL | 254408 | 4/2019 |
| JP | 2002-312375 A | 10/2002 |
| JP | 2003-223462 A | 8/2003 |
| JP | 2004-334657 | 11/2004 |
| JP | 2008-052601 A | 3/2008 |
| JP | 2009-134443 | 6/2009 |
| JP | 2010-217952 | 9/2010 |
| JP | 2011-192181 A | 9/2011 |
| JP | 2015512104 | 4/2015 |
| JP | 6163501 | 6/2017 |
| JP | 2017199402 | 11/2017 |
| JP | 6442000 | 11/2018 |
| JP | 2019061698 | 4/2019 |
| JP | 6666412 | 2/2020 |
| KR | 2003-0045765 A | 11/2003 |
| KR | 10-2011-0022627 | 3/2011 |
| KR | 20140136480 | 11/2014 |
| KR | 102047150 | 11/2019 |
| MX | 355293 | 4/2018 |
| SG | 11201405299YA | 9/2014 |
| SG | 10201708442 P | 11/2017 |
| WO | WO-2007/090133 A2 | 8/2007 |
| WO | WO 2009/151928 A2 | 12/2009 |
| WO | 2013130894 | 9/2013 |

OTHER PUBLICATIONS

Extended European Search Report, European Patent Office, European Patent Application No. 19159905.9, dated Jun. 4, 2019.
Chinese Third Office Action, Chinese Application No. 201380021697.4, dated Apr. 11, 2018, 15 pages.
United States Office Action, U.S. Appl. No. 14/382,128, filed Apr. 19, 2018, 16 pages.
Ye, Y. et al., "Mining Individual Life Pattern Based on Location History," Tenth International Conference on Mobile Data Management: Systems, Services and Middleware, 2009, MDM'09, IEEE, May 18-20, 2009, pp. 1-10.
Zheng, Y. et al., "Mining Interesting Locations and Travel Sequences from GPS Trajectories," Proceedings of the 18$^{th}$ International Conference on World Wide Web, WWW 2009, ACM, Apr. 20-24, 2009, pp. 791-800.
Asakura, Y. et al., "Tracking Survey for Individual Travel Behaviour Using Mobile Communication Instruments," Transportation Research Part C: Emerging Technologies, 2004, pp. 273-291, vol. 12, No. 3.
Chinese Second Office Action, Chinese Application No. 201380021697.4, dated Aug. 3, 2017, 13 pages.
European Patent Office, Extended European Search Report issued in corresponding EP Application No. 13755392.1, dated Sep. 11, 2015.
International search report dated Jun. 21, 2013 issued for International application No. PCT/US2013/028440.
Israel Office Action, Israel Application 234340, dated May 10, 2017, 3 pages.
Japanese Office Action, Japanese Application No. 2014-560061, dated Nov. 29, 2016, 4 pages.
Mexican Office Action, Mexican Application No. MX/a/2014/010371, dated Nov. 14, 2016, 7 pages.
Mexican Third Office Action, Mexican Application No. MX/a/2014/010371, dated Aug. 1, 2017, 8 pages.
Search Report and First Office Action received in corresponding Chinese patent application No. 2013800216974 and completed on Sep. 26, 2016, 32 pages.
United States Office Action, U.S. Appl. No. 14/382,128, filed Dec. 8, 2017, thirty-one pages.
United States Office Action, U.S. Appl. No. 14/382,128, filed Aug. 15, 2017, thirty-four pages.
United States Office Action, U.S. Appl. No. 14/382,128, filed Nov. 22, 2016, thirty-two pages.
European First Office Action, European Patent Application No. 13755392.1, dated Jan. 24, 2018, 4 pages.
National Intellectual Property Administration, Chinese Search Report and Office Action, Chinese Patent Application No. 2017/11377083, dated Nov. 14, 2019, 9 pages.
"International Application Serial No. PCT US2013 028440, Written Opinion dated Jun. 21, 2013", 10 pgs.
"International Application Serial No. PCT US2013 028440, International Preliminary Report on Patentability dated Sep. 12, 2014", 12 pgs.
"Chinese Application Serial No. 201380021697.4, Response filed Apr. 28, 2017 to Office Action dated Oct. 14, 2016", w English Claims, 28 pgs.
"Chinese Application Serial No. 201711377018.3, Response filed Dec. 12, 2019 to Office Action dated Nov. 14, 2019", W out English claims, 16 pgs.
"European Application Serial No. 13755392.1, Response filed Apr. 11, 2016 to Extended European Search Report dated Sep. 11, 2015", 16 pgs.

(56) References Cited

OTHER PUBLICATIONS

"European Application Serial No. 13755392.1, Response filed May 28, 2018 to Communication pursuant to Article 94(3) EPC dated Jan. 24, 2018", 13 pgs.
"European Application Serial No. 13755392.1, Intention to Grant dated Sep. 21, 2018", 59 pgs.
"European Application Serial No. 19159905.9, Response filed Jan. 16, 2020 to Extended European Search Report dated Jun. 4, 2019", 14 pgs.
"European Application Serial No. 19159905.9, Intention to Grant dated May 15, 2020", 55 pgs.
"European Application Serial No. 19159905.9, Response filed Sep. 18, 2018 to Intention to Grant dated May 15, 2020", 100 pgs.
"European Application Serial No. 19159905.9, Intention to Grant dated Oct. 12, 2020", 55 pgs.
"Canadian Application Serial No. 2,866,123, Office Action dated Jul. 13, 2020", 3 pgs.
"U.S. Appl. No. 14/382,128, Preliminary Amendment filed Aug. 29, 2014", 9 pgs.
"U.S. Appl. No. 14/382,128, Response filed Apr. 24, 2017 to Non Final Office Action dated Nov. 22, 2016", 16 pgs.
"U.S. Appl. No. 14/382,128, Examiner Interview Summary dated Apr. 17, 2017", 3 pgs.
"U.S. Appl. No. 14/382,128, Response filed Oct. 17, 2017 to Final Office Action dated Aug. 15, 2017", 13 pgs.
"U.S. Appl. No. 14/382,128, Examiner Interview Summary dated Oct. 10, 2017", 3 pgs.
"U.S. Appl. No. 14/382,128, Advisory Action dated Oct. 31, 2017", 8 pgs.
"U.S. Appl. No. 14/382,128, Response filed Nov. 14, 2017 to Advisory Action dated Oct. 31, 2017", 12 pgs.
"U.S. Appl. No. 14/382,128, Response filed Mar. 8, 2018 to Non Final Office Action dated Dec. 8, 2017", 16 pgs.
"U.S. Appl. No. 14/382,128, Appeal Brief filed Sep. 17, 2018", 28 pgs.
"U.S. Appl. No. 14/382,128, Appeal Brief filed Oct. 12, 2018", 28 pgs.
"U.S. Appl. No. 14/382,128, Notice of Allowance dated Jan. 23, 2019", 12 pgs.
"U.S. Appl. No. 14/382,128, Corrected Notice of Allowability dated Mar. 7, 2019", 2 pgs.
"Brazilian Application Serial No. BR1120140215740, Voluntary Amendment filed Feb. 29, 2016", w o English Translation, 8 pgs.
"Korean Application Serial No. 10-2014-7027287, Response filed Mar. 4, 2019 to Office Action dated Jan. 4, 2019", w English Translation, 16 pgs.
"Korean Application Serial No. 10-2014-7027287, Notice of Final Rejection dated Jul. 30, 2019", w English Translation, 6 pgs.
"Korean Application Serial No. 10-2014-7027287, Response filed Aug. 29, 2019 to Notice of Final Rejection dated Jul. 30, 2019", w out English translation, 17 pgs.
"Japanese Application Serial No. 2014-560061, Response filed Apr. 27, 2017 to Notification of Reasons for Refusal dated Nov. 29, 2016", w out English translation, 12 pgs.
"Japanese Application Serial No. 2018-219146, Office Action dated Oct. 8, 2019", w English Translation, 4 pgs.
"Japanese Application Serial No. 2017-119566, Notification of Reasons for Refusal dated Jun. 26, 2018", w English Translation, 4 pgs.
"Japanese Application Serial No. 2017-119566, Response filed Sep. 26, 2018 to Notification of Reasons for Refusal dated Jun. 26, 2018", w English Translation, 8 pgs.
"Japanese Application Serial No. 2018-219146, Response filed Jan. 21, 2020 to Office Action dated Oct. 8, 2019", w English Translation, 11 pgs.
"Israel Application Serial No. 234340, Response filed Sep. 10, 2017 to Office Action dated May 10, 2017", w English Claims, 8 pgs.
"Israel Application Serial No. 234340, Office Action dated Nov. 13, 2016", w out English Translation, 2 pgs.
"Israel Application Serial No. 234340, Response filed Apr. 5, 2017 to Office Action dated Nov. 13, 2016", w English Translation, 4 pgs.
"Singapore Application Serial No. 11201405299Y, Notice of Allowance dated May 23, 2017", 3 pgs.
"Singapore Application Serial No. 11201405299Y, Supplementary Examination Report dated Aug. 28, 2017", 3 pgs.

\* cited by examiner

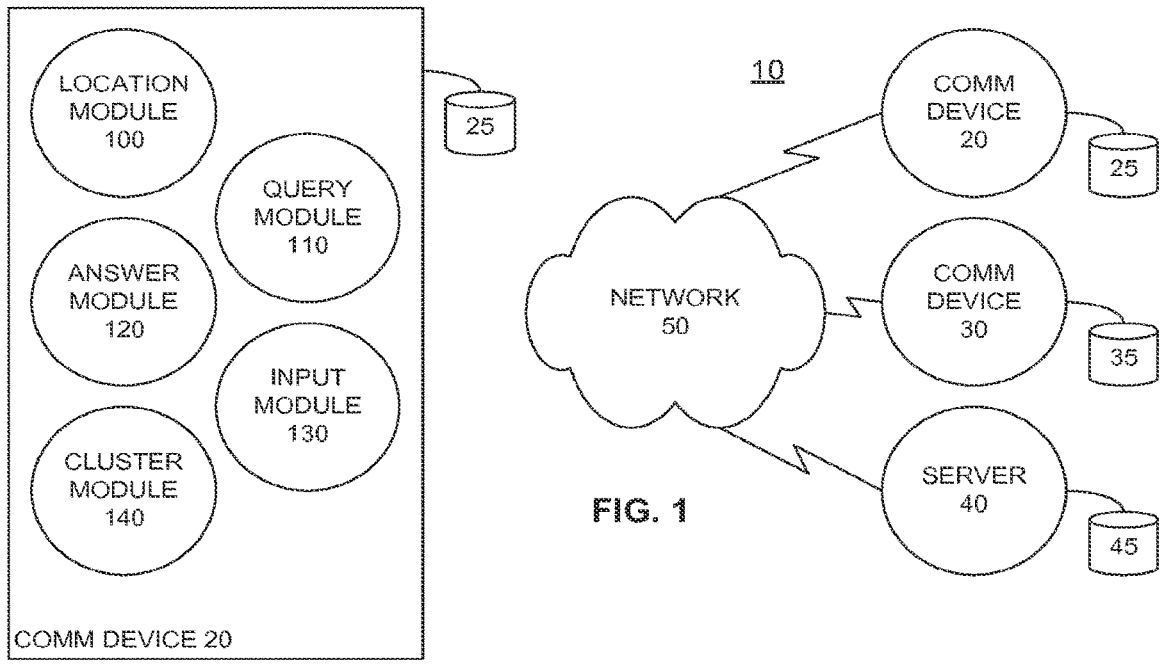
FIG. 1
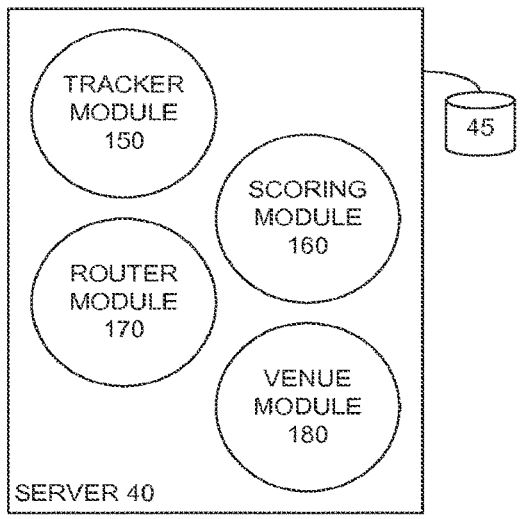
FIG. 2
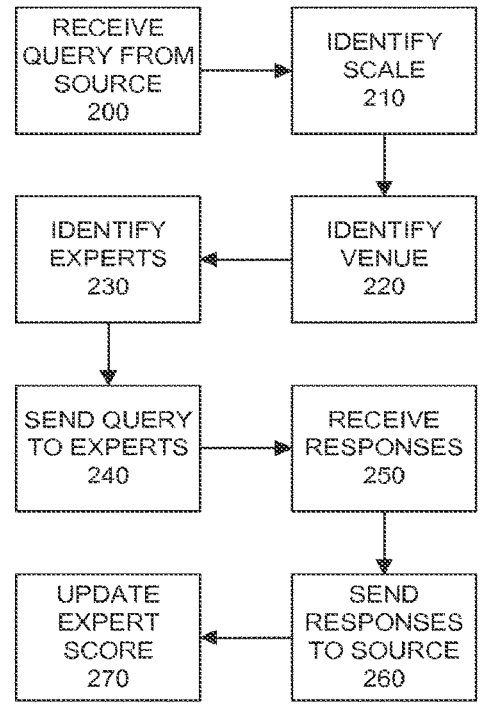
FIG. 3
FIG. 4

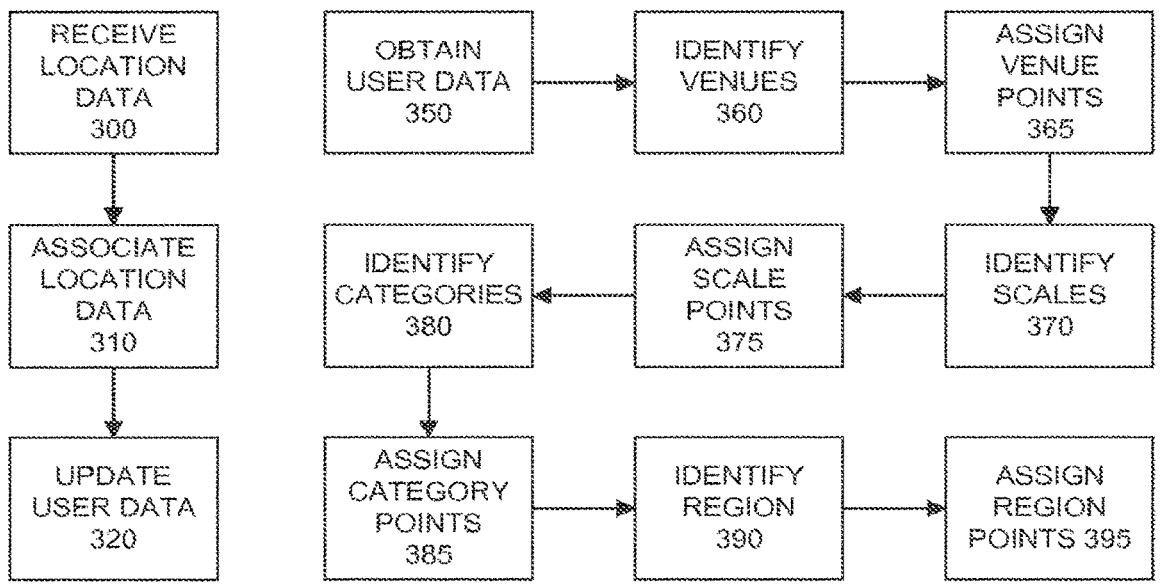
FIG. 5
FIG. 6
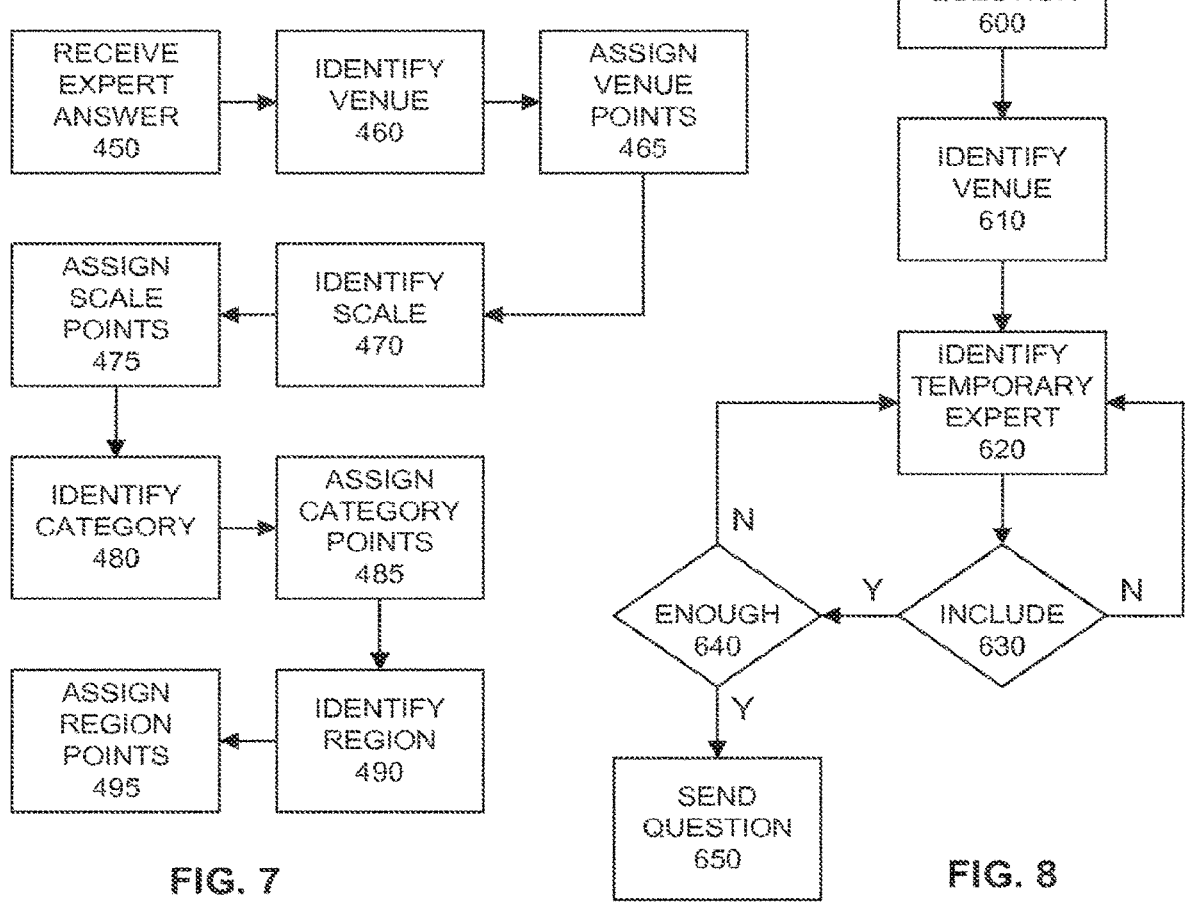
FIG. 7
FIG. 8

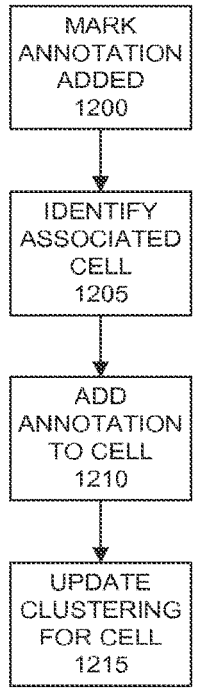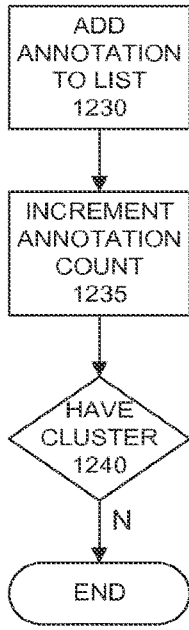
FIG. 12A  FIG. 12B  FIG. 12C
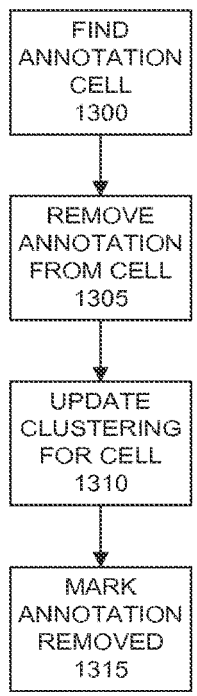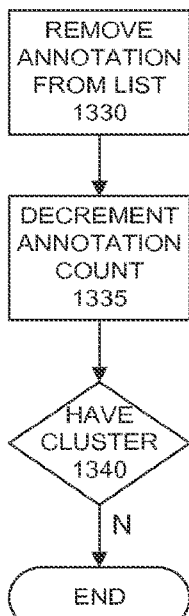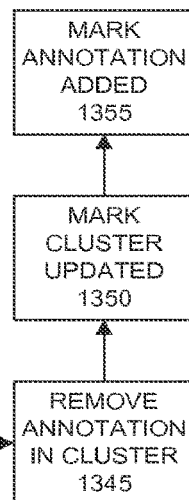
FIG. 13A  FIG. 13B  FIG. 13C

EMPIRICAL EXPERT DETERMINATION AND QUESTION ROUTING SYSTEM AND METHOD

CROSS REFERENCE TO RELATED APPLICATIONS

This application is a divisional of co-pending U.S. patent application Ser. No. 14/382,128, which has a 371(c) of Aug. 29, 2014, which is a National Stage Entry of International Application No. PCT/US2013/028440, filed on Feb. 28, 2013 which claims the benefit of the priority of U.S. Provisional Application No. 61/605,126, filed Feb. 29, 2012, the disclosure of which is incorporated herein by reference in its entirety.

BACKGROUND

Field of the Invention

The present invention is generally related to social media and location based services and is more particularly related to systems and methods for objectively determining one or more experts about specific venues/events. The present invention is also particularly related to systems and methods for objectively determining one or more experts about specific categories of venues/events within a specific geographic region at a particular scale on a map. The present invention is also particularly related to systems and methods for routing questions and answers about a venue/event or category of venue/event within a specific geographic region at a particular scale to and from an expert. The present invention is also particularly related to systems and methods for efficiently representing the location of a plurality of venues/events and/or users within a specific geographic region on a displayed map at a plurality of scales of the map.

Related Art

In conventional online systems, determining who is an expert about a specific venue/event or category of venue/event has historically been very subjective and problematic. These conventional online systems typically require potential experts to provide input regarding the venues/event and/or categories of venues/events they are knowledgeable about. However, the conventional online systems suffer from the autobiographical nature of the information that is used to determine who is an expert about a specific venue/event and/or category of venue/event. The conventional online systems are incapable of validating the autobiographical input from the potential experts and therefore the conventional online systems are unable to accurately determine who an expert is.

The vast majority of conventional online systems do not even attempt to identify an expert and instead merely allow users to post requests about a specific venue/event and/or category of venue/event and/or geographic region and hope that a true expert receives the posted request and timely responds to the posted request. This solution similarly suffers because the requesting user has no way to verify the experience of any potential expert who might receive the posted request and choose to respond. Thus, the alleged expertise of the potential expert who responds is based solely on the potential expert's own perception of her knowledge about the subject of the request. Other conventional solutions naively send a request to a large set of peer users hoping that a true expert peer user will respond to the request and provide an informed answer. This solution equally suffers from the same problems described above in addition to the inherently limited scale of a singular user's social network.

A further limitation of conventional systems is that they lack the ability to efficiently present graphical elements representing the location of a plurality of venues/events and/or users on a displayed map. This problem is particularly amplified when the scale of the map is altered to show a larger geographical area without correspondingly altering the size of the window/screen in which the map is displayed. Conventional solutions have attempted to fractionally overlay the graphical elements on top of each other so that each graphical element occupies some unique portion of the user interface and can thus be selected by a user, for example by hovering a mouse pointer over the unique portion occupied by the graphical element. These conventional solutions are cumbersome and inefficient and introduce significant challenges for users attempting to select individual graphical elements.

Therefore, what is needed is a system and method that overcomes these significant problems found in the conventional systems as described above.

SUMMARY

Accordingly, to solve the above described problems that are found in the conventional online systems as described above, described herein are systems and methods that collect location tracking data to determine the frequency and duration of user visits to specific venues/events and, based on an analysis of the location tracking data, empirically determine the level of expertise of a particular user for a particular venue/event and for categories of venues/events within a specific geographic region at a particular scale on a map.

The location tracking data that is collected for each visit by a user to a specific venue/event includes the specific venue/event visited, the location of the venue/event, the date of the visit, the time of day of the visit and the duration of the visit and other information. Analysis of the collected location tracking data includes a determination of one of more categories related to the specific venue/event and geographic region, the frequency of visits over time for a particular user and a specific venue/event and geographic region, the frequency of visits over time in a particular geographical area (with no associated category of venue/event or with an associated category of venue/event) for a particular user, one or more events happening at the venue during a visit (e.g., happy hour), the variety of categories of venue/event the user has visited over time and geographical area, the variety of venues/events of a particular category the user has visited over time and geographical area, the geographical area in which the user visits venues/events (e.g., city, neighborhood, block, etc.) without association with a category, the number of questions from the system the user has answered, and peer feedback about the answers provided by the user. Other information may also be included in the analysis.

Based on the analysis of the collected location tracking data, the system initially determines (and refines over time) what specific venues/events and categories of venues/events and geographic regions at a particular scale each user is knowledgeable about. Based on these determinations and a comparison of the particular user's level of expertise to her peer users, the system is able to empirically determine what users are experts about particular venues/events and categories of venues/events at a particular geographic region and scale.

Venues/events may include (but are not limited to) businesses, restaurants, parks, happy hours, sporting events, bus routes, commutes, live bands, dancing, karaoke, poetry readings, and so on. Categories range from broad to narrow and may include (but are not limited to) food, nightlife, exercise, sushi, burgers, breakfast, coffee, vegetarian, etc. Scales can range from a large geographic region to a small geographic region and may include (but are not limited to) city, neighborhood, block, etc. and may also include arbitrarily defined geographical regions of varying sizes (referred to hereinafter as "cells").

Advantageously, the system may collect location tracking data using active check-in information from a variety of mobile device applications. For example, applications such as Foursquare™, Facebook™, Google Latitude™, Twitter™, and others allow users to identify a venue/event where the user is presently located. The system may also collect location tracking data using periodic or continuous global positioning system ("GPS") or other coordinate based tracking of a mobile device that is associated with the user. For example, triangulation tracking of a mobile device may also be employed. Additionally, the venue/event category (e.g., sushi restaurant, park, coffee shop) can be identified by the system by correlating the venue/event location (e.g., map coordinates, GPS coordinates, etc.) to one or more specific venues/events or categories. The correlation of locations and categories can be stored in a data storage area accessible to the system and can also be obtained from external sources such as Foursquare™, Facebook™, and other sources that are accessible via network communication.

Once the system has collected and analyzed sufficient location tracking data, the system can periodically or continuously determine based on location tracking data who is an expert about a particular venue/event and who is an expert about a particular category of a geographic region at a particular scale. Using the empirically determined expert status, the system provides real time routing to one or more experts questions received from peer users about a venue/event and/or about a category at a particular scale. A response from an expert to such a question is received by the system and provided to the requesting peer user, also in real time.

Additionally, the system provides a user interface with graphical elements overlayed on a scaled map that represent one or more users or venues/events ("annotations"). As the scale of the map being displayed changes, the annotations are graphically combined or separated to increase usability and decrease both server workload and client workload. Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIG. 1 is a network diagram illustrating an example system for empirical expert determination and question routing according to an embodiment of the invention;

FIG. 2 is a block diagram illustrating an example communication device according to an embodiment of the invention;

FIG. 3 is a block diagram illustrating an example server device according to an embodiment of the invention;

FIG. 4 is a flow diagram illustrating an example process for receiving a question and providing an expert response according to an embodiment of the invention;

FIG. 5 is a flow diagram illustrating an example process for tracking location based information for a user according to an embodiment of the invention;

FIG. 6 is a flow diagram illustrating an example process for analyzing location based information to facilitate expert determination according to an embodiment of the invention;

FIG. 7 is a flow diagram illustrating an example process for updating an expert profile in accordance with the expert's response to a question according to an embodiment of the invention;

FIG. 8 is a flow diagram illustrating an example process for routing a question to a temporary expert according to an embodiment of the invention;

FIGS. 12A-C are flow diagrams illustrating example processes for adding an annotation to a map according to an embodiment of the invention;

FIGS. 13A-C are flow diagrams illustrating example processes for removing an annotation from a map according to an embodiment of the invention;

DETAILED DESCRIPTION

Figure 9:
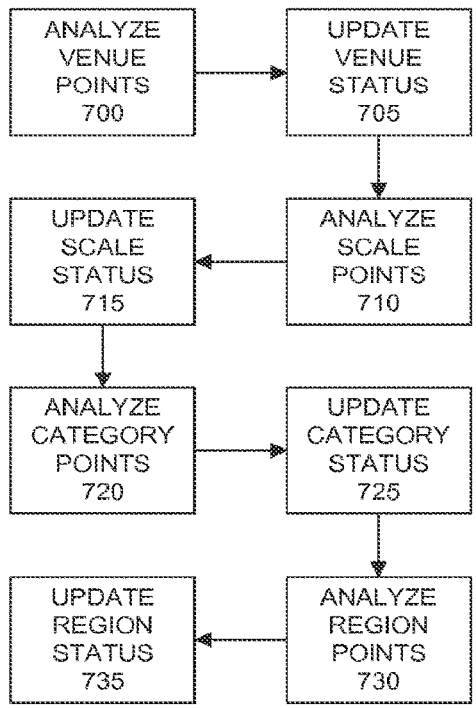
FIG. 9 is a flow diagram illustrating an example process for identifying experts according to an embodiment of the invention.

Certain embodiments disclosed herein provide for a system that empirically determines expertise based on user location data and routes questions about venues/events and categories of venues/events to identified experts about the venues/events. For example, one method disclosed herein allows for the system to present a map on a user interface at a particular scale, receive a question from the user seeking a recommendation for a good sushi restaurant, identify one or more experts in sushi restaurants at the scale of the map, route the question to the identified experts, receive a response from one or more of the experts and provide an answer to the querying user. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

It should be noted that in the present description, the term venue/event is used interchangeably with the terms venue and event. According to the present description a venue/event is a particular location or route that has a particular purpose and may have also a particular duration. For example, a venue/event can be a restaurant, a bus route and a professional football game. Another example of a venue/event is a multisport complex that has a single location but hosts multiple types of events. Accordingly, in this example a first venue/event can be a baseball game at the multisport complex and a second venue/event can be a football game at the same multisport complex.

It should additionally be noted that the various categories of venues/events can have a hierarchical or relational structure such that a specific venue/event that is, for example, a sushi restaurant can belong to several related and/or hierarchical categories such as food, sea food, raw food, pescatarian food, Asian food, and the like.

It should additionally be noted that the present description refers to scales on a map and those scales can be related to geographic cells belonging to a hierarchical division of the surface of the earth into parent cells and child cells. Those scales can also be related to arbitrary geographic regions presented on a display of a communication device or predetermined regions such as neighborhoods and blocks and the like. Also, in some instances a user can be an expert in a geographic region at a particular scale on the map and such expertise may be in association with one or more categories or such expertise may not have any associated category, or alternatively stated, such expertise may be for all categories.

In operation, the system receives location data as input. The location data may be received in discrete units, for example location data may be received each time a user checks into a venue or publically posts a status update from a known location. Location data may also be continuously received, for example via real time location tracking using GPS or other coordinate based location utilities. The system periodically or continuously analyzes the location data on a user by user basis to determine the level of expertise for each user with respect to specific venues/events and categories of venues/events at a particular scale. When the system receives a question about a specific venue/event or category of venue/event at a particular scale, the system identifies one or more experts corresponding to the specific question and routes the question to the one or more experts. One or more answers from the one or more experts are routed back to the questioner and may also be stored in a data storage area in association with the specific question and the particular venue/event or category of venue/event at a particular scale, or in association with some other aspect that the question was about.

The system receives and analyzes a variety of information to develop a rich profile about each user. For example, the information may include but is not limited to:

1. Location tracking data that is gathered from various sources.

2. Specific venues/events that a user has visited (e.g. Starbucks, Downtown), based on an active check-in or from location tracking (e.g., GPS, triangulation, other) of a communication device associated with a user account.

3. Number of times user has been to the specific venue/event.

4. Date, time and duration of visits to specific venues/events.

5. Category of the specific venue/event (e.g. sushi restaurant, park, coffee shop), which can be obtained by correlating a venue/event to one or more categories (which are gathered from external networked sources such as Foursquare, Facebook, and others).

6. Variety of venues/events and categories of venues/events the user visits.

7. Region and map scale in which the user spends time in (e.g. San Francisco).

8. Questions the user has answered about specific venues/events and categories of venues/events.

The system analyzes the data it has to determine a variety of information. For example, the system maintains a collection of data (in one embodiment, a database) that maps specific venues/events and categories of venues/events to users who are empirically determined to be experts with respect to those specific venues/events and categories of venues/events. For example, given a specific venue/event (e.g. Starbucks on 2nd/Market), the system creates and continuously updates a list of users who are knowledgeable about the specific venue/event based on the collected and analyzed location data. The system also creates and continuously updates a list of users who are knowledgeable about a particular map scale, for example determined by a specific latitude/longitude location and a radius. They system also creates and continuously updates a list of users who are knowledgeable about particular categories of venues/events with a plurality of map scales covering overlapping geographic regions. These lists allow the system to identify experts to whom questions can be routed about specific venues/events and categories of venues/events at a particular scale.

Additionally, the system analyzes each location data input for a particular user and collectively, the location data inputs and the analysis contribute to a total score, which is then translated to an expertise level for the particular user and the specific venues/events and categories of venues/events and geographic regions at a particular scale. Specifically, for each visit to a venue/event, a user receives points for that venue/event and for one or more categories that are associated with that particular venue/event. In one embodiment, a visit to a particular venue/event may include points for that specific venue/event, one or more categories associated with that specific venue/event and a neighborhood, city, and/or other possibly (but not necessarily) overlapping geographic regions associated with that specific venue/event. It may also include points for a specific event and/or category of event that was happening at that venue at the time of the visit (e.g., happy hour, DJ, poetry reading, sporting event, etc.).

In one embodiment, the system tracks the questions answered by each user and for each question a user answers about a specific venue/event, a user accumulates expertise points for that specific venue/event and any associated categories of venues/events. This includes points for that specific venue/event, related categories of venues/events, and corresponding geographic regions.

The system continuously analyzes the information it has collected and extrapolated (e.g., the system might extrapolate a specific venue/event from GPS location data) in combination with the related points and scores for each user with respect to specific venues/events and categories of venues/events at a particular scale and related geographical regions and determines a user to be an expert with respect to each such topic if the point total accumulated exceeds certain thresholds. The thresholds may be static or variable and may also be established relative to other users in the system.

Furthermore, the system may also identify a user as a temporary expert for a particular venue/event or geographic region. For example, a user that is currently at a particular venue/event, or that has been to that venue/event recently (e.g., within the last one hour or within the last two hours) may be considered a temporary expert. Accordingly, the system may route certain types of questions that require real time or very current knowledge about a location to a temporary expert. For example, if a user is on vacation and at an unfamiliar restaurant in an unfamiliar city, the user may still be determined to be a temporary expert and questions such as how crowded the restaurant is or when does happy hour end can be appropriately routed to the temporary expert.

In one embodiment, points assigned to a user may decay over time, such that a user must maintain a certain point threshold (or a certain number of points relative to her peers) in order to maintain the expertise level. Furthermore, the number of points awarded for specific venues/events may attenuate as they are assigned to larger and larger map scales or broader and broader categories. For example, a check-in at a specific venue/event assigns X points for the specific venue/event, Y points for the atomic geographic cell (e.g., the smallest geographic region used by the system) in which the venue/event is located, and Z points for the most specific category associated with the venue/event. However, the system may also assign Y-A points for the next larger geographic cell and Y-B points for the next even larger geographic cell. Similarly, the system may also assign Z-A points for a next level of categories and Z-B for a further broadened level of categories.

For example, if the venue/event is Sushi Ota in San Diego, the user may receive Y points for the geographic cell at map scale level 8 (the smallest geographic cell) in which the Sushi Ota restaurant is located, receive Y-A points for the geographic cell at map scale level 7 that includes the level 8 cell in which the Sushi Ota restaurant is located, and further reductions in point values as the map scale level decreases (where map scale level 1 has the largest geographic cells). Similarly, the user may receive Z points for sushi restaurants, Z-A points for seafood restaurants, Z-B points for restaurants, Z-C points for food, and so forth. As long as the attenuation applies the same to all users, the system is advantageously configured to approximate the expertise of its users for specific venues/events based on user expertise for particular categories of venues/events. Even more advantageously, the system can identify one or more experts based on cross correlation between expertise levels of categories and geographic locations.

In one embodiment, points awarded may be divided amongst multiple categories or geographic regions. For example, if an expert user answers a general question about a large geographic region that includes two neighborhoods (or a plurality of geographic cells), each of those neighborhoods (or cells) may be assigned a portion of the assigned point total. The portions assigned to each neighborhood (or cell) may be equal or unequal and the cumulative total of the points assigned to each neighborhood (or cell) may even be less than or more than the total points assigned to the larger region (parent cell).

In one embodiment, the expert point thresholds may be dynamic, based on the total expertise level of the current user population in the system. For example, if there is an excess of experts for a particular location/venue, the threshold level of points required to be determined as an expert may automatically increase to raise the bar for being identified as an expert with respect to that specific location/venue.

Figure 16:
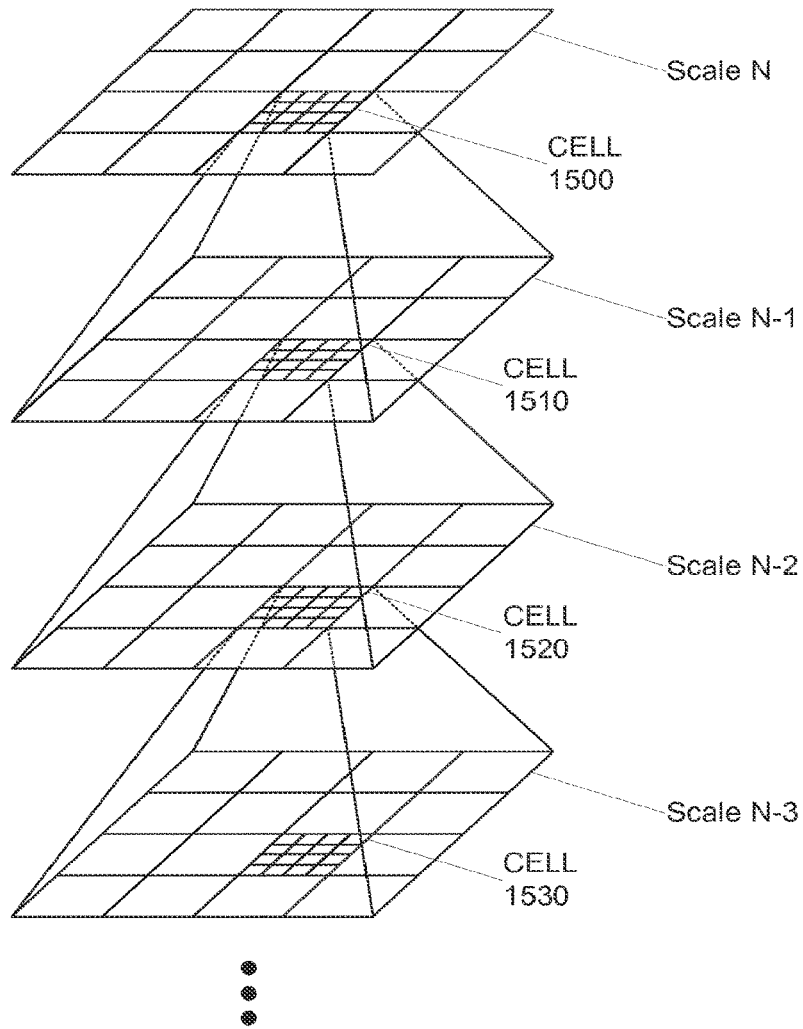
FIG. 16 is a block diagram illustrating example map scales and map cells according to an embodiment of the invention.
Figure 17:
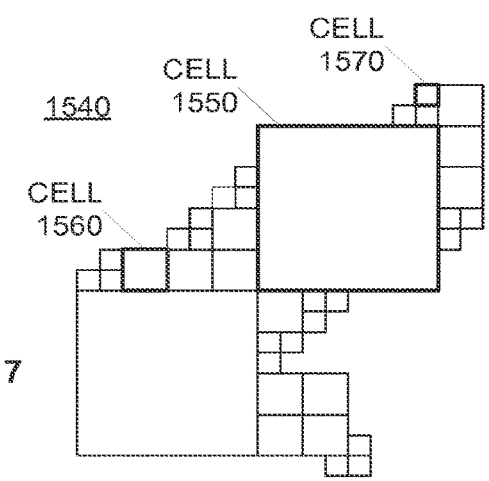
FIG. 17 is a block diagram illustrating an example region defined by map cells at a plurality of scales according to an embodiment of the invention.

Turning first to FIGS. 16 and 17, an explanation of map scale and the corresponding geographic cells is provided. FIG. 16 is a block diagram illustrating example map scales and geographic cells according to an embodiment of the invention and FIG. 17 is a block diagram illustrating an example geographic region defined by geographic cells at a plurality of scales according to an embodiment of the invention. For example, the geographic region of FIG. 17 may tightly correspond to a neighborhood boundary as understood by the local population living in that area.

Initially, and as will be understood by those skilled in the art, the globe may be logically divided into smaller and smaller equally sized geographic regions. For ease of explanation we will refer to these equally sized regions as geographic cells. The largest cell would be the globe itself at map scale level 1 and this cell can be equally divided into two hemispherical cells that would correspond to map level 2 and so forth. For the purpose of location based services, such large geographic cells are impractical and therefore in one embodiment, the globe is divided into 16 geographic cells at map level 1 and then each of those cells are also divided into 16 geographic cells at map level 2 and so forth until the smallest geographic cell is a reasonably sized geographic region with respect to location based services. In one embodiment, the smallest geographic cell is roughly one square meter.

As shown in FIG. 16, map scale level N is the highest map scale and contains sixteen equally sized geographic cells. Each geographic cell can be subdivided into sixteen equally sized geographic cells and in the illustrated embodiment, geographic cell 1500 at map scale N is so divided and blown up and shown as map scale level N−1. Similarly, geographic cell 1510 at map scale N−1 is also divided and blown up and shown as map scale level N−2. Geographic cell 1520 at map scale N−1 is also divided and blown up and shown as map scale level N−3, which includes geographic cell 1530 that can similarly be divided until the desired level of granularity is obtained. Advantageously, this logical division into geographic cells can be accomplished using GPS coordinates or latitude and longitude coordinates or some other similar system.

Because the geographic regions occupied by people do not employ such logical boundaries, FIG. 17 illustrates how an existing neighborhood can still be defined using geographic cells from a plurality of map scales. In one embodiment (not shown) a neighborhood could be geographically described as the aggregate of all of the atomic geographic cells (the smallest geographic cells) within the neighborhood boundary. An improvement over this is shown in FIG. 17 where the neighborhood is geographically described using the minimum number of geographic cells, which is an aggregate of all of the largest cells from each map layer that fall within the neighborhood boundary.

Turning back now, FIG. 1 is a network diagram illustrating an example system 10 for empirical expert determination and question and answer routing. In the illustrated embodiment, the system 10 comprises one or more servers 40 and a plurality of user communication devices 20 and 30. Each of these components of the system 10 is configured with a data storage area 25, 35 and 45 respectively. The various components of the system 10 communicate via a wired or wireless network 50, and may run a variety of protocols and applications as will be understood by those skilled in the art. Advantageously, the server 40 and the communication devices 20 and 30 are accessible for communication across the network 50. Communication devices 20 and 30 and the server 40 may be implemented as a processor enabled device including, but not limited to, personal computers, laptops, smart phones, and handheld devices just to name a few. An example processor enabled device is later described with respect to FIG. 19.

FIG. 2 is a block diagram illustrating an example communication device 20 according to an embodiment of the invention. In the illustrated embodiment, the device 20 comprises a location module 100, a query module 110, an answer module 120, an input module 130 and a cluster module 140. The communication device is configured with a data storage area 25.

Location module 100 is configured to determine the location of the communication device 20 (and correspondingly the user). In one embodiment, the location module 100 communicates with a GPS module built into the hardware of the device 20. The location module 100 can be accessed by other modules on the device 20 and in response may provide a requesting module with the current location of the device 20 (and correspondingly the user). Such information about the location of the user may advantageously be communicated to the servers 40. The location module 100 can be accessed when showing a user's location on a map, when sending questions, when answering questions, and other cases. The map is loaded using a native map module (not shown). In one embodiment, the native map module is provided by the operating system of the communication device 20.

The query module 110 is configured to interact with a user and accept a user question and communicate that question to the one or more servers 40. In one embodiment, the question comprises a question string, a current location of the user, a location of the question area (i.e., map scale), an optional radius, an optional set of venue ids, and optional categories of places. The query module 110 accepts input from the user and communicates the query data to the one or more servers 40. In another embodiment, the user states the question verbally, and the message is transcribed to text on the communication device 20, or is transcribed remotely by a voice to text module on a server that is accessible via a network connection. In one embodiment, a user selects an area of interest on a map, panning and zooming until the area of interest is shown on the screen. This selection translates to a latitude/longitude and a radius, which is determined to be the map scale and the map scale is communicated to the one or more servers 40. In another embodiment the map scale is determined by accepting text input from the user representing the name of a neighborhood, or intersection, or city name. In another embodiment the map scale is determined by parsing the question string looking for names of areas, where the one or more servers 40 determine the map scale after the query has been received.

The answer module 120 is configured to receive input from an expert user who is answering a question that has been sent to that user as an expert. In one embodiment, the answer module 120 presents to the user on the display of the communication device 20 the question, the specific venue/event, the category of the venue/event, the map scale associated with the question, the location of the question (latitude/longitude/radius), the user sending the question (optionally), the time the question was sent, and any answers the question has already received. In one embodiment, the answer module 120 receives as input an answer string and optionally one or more venue/event identifiers, one or more photos, a map scale identifier, one or more locations (latitude/longitude/radius), one or more geographic region identifiers (e.g., a neighborhood), an anonymous flag, and a share to social networking flag. Once the answer string is received, the answer module 120 sends the answer string to the one or more servers 40 and displays to the expert user a confirmation message or error message. In the confirmation message, the answer module 120 may show the expert user a point total the expert user earned for answering the question.

The input module 130 is configured to receive input from a questioning user or an expert user on the communication device 20. The input module 20 works in cooperation with the query module 110 and the answer module 120. In one embodiment, the input module 20 receives one or more of the following: a text string, one or more locations (latitude/longitude/radius), one or more venue identifiers, one or more categories of venues/event, one or more map scales, one or more photos, one or more flags to allow sharing to social networks or to allow anonymous participation by any user.

In an alternative embodiment, the input module 130 allows a user to provide information to the one or more servers 40 about a particular venue/event. For example, a user at a specific venue may access the one or more servers 40 using the device 20 and use the input module 130 to provide demographic and/or current information about the specific venue/event. For example, the user may fill in missing information in the profile for the specific venue/event that is missing from the data storage area on the one or more servers 40. This may include the hours of operation of the venue/event, whether or not the venue/event includes bathrooms, or serves alcohol, etc. Advantageously, the one or more servers 40 may create and maintain a profile for a plurality of venues/events and the profile information may be made available for editing by a user when the specific location of the communication device 20 associated with the user is verified to be at the known location of the particular venue/event.

The cluster module 140 is configured to determine when to consolidate or break apart individual annotations that are displayed on the user interface of a user communication device 20. For example, when a map is displayed on the user interface of a user communication device 20 at a first scale, there may only be a few users and venues/events that are resident on the map at the first scale, which may represent a relatively small geographic area. However, when the scale of the map is increased such that the displayed map represents a relatively large geographic area, there may be tens or hundreds of users and venues/events to be displayed on the user interface. The cluster module 140 is configured to determine when to combine annotations into a cluster and when to break apart clusters into individual annotations, into separate clusters, or some combination of annotations and clusters.

In one embodiment, the cluster module 140 is configured to analyze the annotations to be displayed on the map and the particular coordinates of each annotation. If the coordinates of a first and second annotation are such that the displayed first and second annotations would overlap each other by a predetermined percentage, then the cluster module 140 is configured to combine the first and second annotations into a first cluster and present the first cluster as a single annotation on the map in the displayed user interface. Similarly, if the coordinates of a third and fourth annotation that are currently combined into a second cluster are such that the displayed third and fourth annotations would not overlap each other by a certain percentage, then the cluster module 140 is configured to break up the second cluster and individually present the third and fourth annotations as separate annotations on the map in the displayed user interface.

As will be understood by those skilled in the art, such a technique can be applied each time the user interface is rendered in order to combine annotations into clusters, combine clusters into clusters and combine annotations and clusters into clusters. Similarly, this technique can also be employed each time the user interface is rendered in order to break apart clusters into a plurality of annotations and clusters or some combination of annotations and clusters.

FIG. 3 is a block diagram illustrating an example set of core server 40 modules according to an embodiment of the invention. In the illustrated embodiment, the server 40 comprises a tracker module 150, a scoring module 160, a router module 170 and a venue module 180. The tracker module 150 tracks the past and current locations of users. A location may include the latitude and longitude, a timestamp, a unique id, and may also include a radius, a measure of accuracy, a venue/event name, a map scale level, a geographic cell identifier, a neighborhood name, a city name, a list of categories that describe this venue/event, and a description of the source of this information. In one embodiment of the invention, the location accuracy is measured by the accuracy of the GPS module on a communication device, which is communicated to the one or more servers 40.

The tracker module 150 stores the location history of every user in the data storage area 45, and can be queried to retrieve the information. For example, the tracker module 150 can be queried to provide the last location of a user, and the last time a user has been to a specific venue/event, and the number of times a user has been to a specific venue/event. Queries to the system can be limited by a number of filters, including time, map scale, venue/event category, user, and venue. Queries can be sorted by a number of attributes including time, distance from a point, venue/event name, and user name.

The tracker module 150 cooperates with the location module 100 to receive periodic updates as to where a user is and has been. The tracker module 150 may also receive input from third party applications that provide venues/events visited by users of those third party applications and services. Some examples of these third party applications and services include Foursquare™, Facebook™, Yelp™, and Google Latitude™.

The scoring module 160 tracks points and expertise across the system, and is configured to determine expert users with respect to a given venue/event and category of venue/event. Scores are stored in the data storage area 45, associated with a specific user by that user's unique id, and scores are updated when the system receives new information about that user. In one embodiment of the invention, each user accumulates points for a specific venue/event (e.g., Sushi Ota), a category of venue/event (e.g., restaurant) and a geographic region (e.g., a geographic cell, latitude/longitude/radius or neighborhood). FIG. 7 describes this process in more detail below. Turning back to FIG. 3, the data storage area 45 stores the point totals by associating the user's unique id with the venue/event, the map scale, and one or more categories corresponding to the venue/event. For example, in one embodiment, when tracking expertise for a specific venue/event, the system stores and updates a database row that associates one or more users, the particular venue/event and the total number of points accumulated by each user for that venue/event. The system may also store the last time this row was updated, whether this point total has exceeded a predetermined or dynamically determined threshold of expertise, and whether the system has received a request by the user to disable this expertise.

An additional example describes the storage of expertise for a particular map scale. Map scales can include states, cities, neighborhoods, blocks, and any specific latitude/longitude/radius in the world. Expertise points are stored by associating a user and a map scale in two ways. The first is by determining one or more names for the scale, for example, the neighborhood, the city, state, and so on. In this case, the system assigns points to the user expertise in the neighborhood, the city, etc. In this embodiment, the system stores this information as a row in the database that associates the user (using the user id), and the named region.

A second method for tracking user expertise for a particular map scale is by dividing up the world into a grid, at different levels of granularity as described above. In one embodiment, this can be accomplished using geohashing. Accordingly, the system tracks expertise points for a user at each level of granularity, associating a user (using the user id) and a geographic cell (for example, "8effa93").

The scoring module 160 determines the level of expertise in each of the types of expertise (e.g. venue/event, category, scale) by analyzing the number of points accumulated for that type of expertise. Once a user has reached a certain threshold (for example, 100 points) that user is determined to be an expert for the specific venue/event, category, scale, etc. (e.g. expert in Coffee Shops, expert in Sushi, expert in Downtown, expert in geographic cell "8effa93"). In one embodiment, there are a plurality of thresholds which determine a plurality of expert levels. For example, 100 points may represent level one, 200 points may represent level two, and so on. These thresholds are variable, and can be set manually or can be dynamically generated based on the user population size and distribution of points in the system.

The scoring module 160 is also configured to identify one or more experts in a given map scale I geographic region in one or more categories. In one embodiment, the scoring module 160 receives as input the scale (or geographic area), one or more categories, and the number of experts required. The scale (or geographic area) can be determined by accepting an identification of one or more geographic cells or by accepting a latitude/longitude/radius tuple, which can be translated into one or more grid cells as previously discussed with respect to FIG. 17.

In one embodiment of the invention, geographic cells are indexed by "geo hash codes". A "geocell hash code" is a sequence of hexadecimal characters that uniquely identifies a two-dimensional geospatial rectangle (e.g. "8effa93a").

Codes are hierarchically assigned by repeated subdivision of the world by 4-by-4 grids, as in a 16-way tree, such that each hexadecimal character identifies a unique cell on the grid. Longer hash codes represent finer subdivisions at deeper levels of the tree. To decode a hash code, the system begins by dividing the world into a 4-by-4 grid. Each hexadecimal character of the hash is used to sequentially select a rectangular cell from the grid, which, in turn, becomes the extent of a new 4-by-4 grid. The process terminates after reaching the final character of the hash code.

The data storage area 45 is queried to identify users in the area that have point totals exceeding the point threshold for an expert, in the given categories. In one embodiment of the invention, a query begins at the most granular level of map scale, and continues to look at coarser and coarser scales or lower and lower point totals until the desired number of experts have been identified. In this embodiment, the total number of points may be normalized such that as the coarseness of the specified scale increases, the points are multiplied by the level of coarseness. For example, at level 8 (e.g. eight characters in the hash code "8effa93a") the point threshold required to be an expert is 10, but at level 7 (e.g. seven characters in the hash code "8effa93") the point threshold required to be an expert is 100. In one embodiment of the invention, the results are finally sorted by the number normalized points across the entire set of users.

The venue module 180 is configured to manage and store information about venues/events. This information is stored in the data storage area 45. In one embodiment, the information may include the venue/event name, the latitude and longitude and radius to determine the map scale, a geographic cell identifier to determine the map scale, the venue/event address, the venue/event categories (e.g. night club, Indian food, etc.), references to that venue/event in third party services (e.g. Foursquare™ venue id), the twitter handle of the venue/event, the timestamp of the last update to this venue/event and other information. The venue/event information may also include various attributes about the venue/event such as the hours of operation, whether or not the venue/event servers alcohol, has public restrooms, etc. This data may be retrieved from a variety of sources (for example, Foursquare™, the website for the specific venue/event) or received from users who are identified as experts or temporary experts (e.g., a user currently at the location may be a temporary expert) and this information is advantageously stored in the data storage area 45. This information is updated on a regular basis, by querying these external sources for changes and/or receiving additional input from users. This data may also be updated manually by system administrators or by the owners/managers of the venues/events. Advantageously, each venue has a unique identifier in the data storage area that can be used in the various other modules of the system (e.g. scoring module 160).

FIG. 4 is a flow diagram illustrating an example process for receiving a question and providing an expert response according to an embodiment of the invention. The process can be carried out in a system such as the one previously described with respect to FIGS. 1-3. In the illustrated embodiment, the process begins in step 200 by receiving a query from a source. In one embodiment, the source is a user of a communication device. This query can come from the query module 110 or a third party implementation of a query module (e.g., using a third party module with an application programming interface to communicate with the one or more servers 40). This received query is analyzed to identify parameters that allow the system to route the question. In one embodiment of the invention, the system first analyzes the question to identify any inappropriate language. In another embodiment of the invention, the system analyzes the question to find any matches to a previous question already asked in the area. If a match is found, the system may return the answer provided previously.

After receiving the query, in step 210 the system identifies the map scale associated with the question. The map scale can be determined based on the scale of a map displayed on the communication device of the user who submitted the question. Next, in step 220 the system identifies a venue/event associated with the question. In some circumstances, there may not be any venue/event associated with the question, for example if the question is seeking the name of a venue/event: "What is a good Sushi restaurant around here?" Once the scale and/or venue/event has been identified, in step 230 the system identifies one or more experts that can answer the question. As described above the experts are identified based on their calculated expertise with respect to the map scale and/or the specific venue/event. The query is then sent to the one or more identified experts in step 240 and the system receives one or more responses from the one or more experts in step 250. The one or more responses (or a subset of them) are then sent to the source in step 260 and the expert profiles are updated in step 270 to reflect each expert's participation in the question and answer session. Notably, the participation by the expert may cause the expert's total point value to increase or decrease based on how the expert participated. In one embodiment, steps 230 and 240 can be implemented using a process similar to the process described later with respect to FIG. 8, steps 620-650 such that a desired number of experts are identified as intended recipients of the question and then the question is sent to that group of experts.

When identifying the map scale and the venue/event, the system may communicate with the tracker module 150 and/or the venue module 180. When identifying experts, the system may communicate with the scoring module 160, and when sending the query to the experts, the system may communicate with the router module 170. In one embodiment, the system stores the question and the selected experts and the received answers to the data storage area 45. For example, the system may store all of the parameters provided in the query, a list of the expert users (user ids) that were selected and the answers provided by each expert.

Also, when sending the query to the experts, the system may communicate with the answer module 120 on the communication device of each identified expert such that the answer module presents the expert user with the question. In one embodiment, the received answer is sent to the user asking the question without delay and in an alternative embodiment the responses first pass through a system which looks for inappropriate language or other predetermined criteria.

FIG. 5 is a flow diagram illustrating an example process for tracking location based information for a user according to an embodiment of the invention. The illustrated process can be carried out by the system previously described in FIGS. 1-3. In the illustrated embodiment, in step 300 the system receives location data corresponding to a user. The location data may be received from a location module 100 that is resident on the communication device of the user. In one embodiment, the location data may originate from check-in services such as Foursquare and Facebook and may also be derived from other information such as GPS information related to the communication device 20 and social media information other than check-in services. For example, the location data may be derived from the content of a user's social media interactions on Twitter or another third party service. The location data may include latitude, longitude, a radius, a measure of accuracy, a user id, a user id from the third party service (e.g. Foursquare user id), a timestamp for the time of the location update, a venue id if the location is at a known venue, and a geographic cell. The location data may include other information as well. This location data information is associated with a particular user in step 310 and in step 320 the user data is updated to reflect the additional location data information. In one embodiment, updating the user data may also include revising the user's expert score for one or more venues/event, categories of venues/events, map scales, geographic regions, and the like.

FIG. 6 is a flow diagram illustrating an example process for analyzing location based information to facilitate expert determination according to an embodiment of the invention. In one embodiment, the process can be carried out by the system previously described with respect to FIGS. 1-3. In the illustrated process, user data is obtained in step 350. For example, user data may be obtained from the data storage area 45. Next, in step 360 the user data is analyzed to identify specific venues/events that the user has been to and the user is assigned venue/event points in step 365 based on the number of and frequency of visits to each venue/event. Similarly, in step 370 the user data is analyzed to identify the map scales corresponding to user visits to one or more venues/events. For example, if the user has many visits to a variety of venues in a particular geographic cell, then points may be awarded for the map scale corresponding to that particular cell. Accordingly in step 375, scale points are assigned to the user based on the identified scales and the analysis of the obtained user data. Next, in step 380 the user data is analyzed to identify one or more categories that correspond to user visits to venues/events and other user location tracking data and in step 385 category points are assigned. Similarly, in step 390 the location data is analyzed to identify regions in which the user spent time and visited venues/events and in step 395 region points are assigned to the user.

In one embodiment, the number of assigned points may vary depending on a desired allocation and the points that are assigned are added to a cumulative total for the user for the particular venue in step 360 the user data is analyzed to identify specific venues/events that the user has been to and the user is assigned venue/event points in step 365 based on the number of and frequency of visits to each venue/event, category of venue/event, and so on. In one embodiment, a venue can be identified for example by a venue identifier included in the location information or by communicating with the venue module 180. The category can also identified by communicating with the venue module 180. In one embodiment, the map scale can be identified by converting a given latitude, longitude, and radius into a set of regions (e.g. neighborhoods, cities) and/or geographic as previously described above.

FIG. 7 is a flow diagram illustrating an example process for updating an expert profile in accordance with the expert's response to a question according to an embodiment of the invention. The illustrated process can be carried out by the system previously described with respect to FIGS. 1-3. Initially, in step 450 an answer from an expert is received by the system. The answer (and possibly also the corresponding question) is analyzed to identify the venue corresponding to the answer in step 460. In some cases there may not be a venue associated with the answer, for example, when the question is related to a category. If there is an associated venue, in step 465 the system assigns venue points to the expert user's profile. Next, in step 470 the answer (and possibly question) is analyzed to identify one or more map scales associated with the answer and in step 475 scale points are assigned to the expert user for one or more map scales. Similarly, in step 480 the answer (and possibly question) is analyzed to identify one or more categories associated with the answer and in step 485 category points are assigned to the expert user for one or more categories. Finally, in step 490 the answer (and possibly question) is analyzed to identify one or more geographic regions associated with the answer and in step 495 region points are assigned to the expert user for the one or more geographic regions.

FIG. 8 is a flow diagram illustrating an example process for routing a question to a temporary expert according to an embodiment of the invention. The illustrated process can be carried out by the system previously described with respect to FIGS. 1-3. Initially, in step 600 the system receives a question from a user, for example via the query module 110 or a third party implementation of a query module. Next, in step 610 the question is analyzed to determine the specific venue/event associated with the question. The system next analyzes data in the data storage area 45 that is related to the identified venue/event in order to identify temporary experts with respect to the identified venue/event, as shown in step 620. For example, in one embodiment, a temporary expert can be a person that is currently located at the venue/event, regardless of the person's expert point level with respect to the particular venue/event. In one embodiment, the scoring module 160 may identify the available temporary experts for the identified venue. Next, in step 630 the system determines if it will include the identified temporary expert in a list of intended recipients of the question and, for example, adds the temporary expert to a list of experts to which the question will be routed. If a sufficient number of temporary experts have been identified (e.g., more than a predetermined threshold number), as determined in step 640, then the system will send the question to the identified experts in step 650. However, if enough experts have not yet been identified, the system loops back to step 620 to identify additional temporary experts. The system continues to loop through and analyze potential temporary experts in this fashion until it has selected a sufficient number (e.g., one or more) of experts to route the question to. In one embodiment, certain experts that would otherwise be identified as temporary experts are not selected. For example, if the user has disabled communication with the system, the user has activated a "do not disturb" flag, the user has opted out of a certain topic/area, etc.

FIG. 9 is a flow diagram illustrating an example process for identifying experts according to an embodiment of the invention. The illustrated process can be carried out by the system previously described with respect to FIGS. 1-3. Initially, in step 700 the system analyzes the user profile data in the data storage area 45 to identify users who have exceeded an expert point threshold for a particular venue/event. Based on this analysis, in step 705 the system updates the venue status for those users—if the user is not already identified as an expert for that venue/event. Similarly, in step 710 the system analyzes the user profile data in the data storage area 45 to identify users who have exceeded an expert point threshold for one or more map scales. Based on this analysis, in step 715 the system updates the map scale status for those users—if the user is not already identified as an expert for the one or more map scales. Also, in step 720 the system analyzes the user profile data in the data storage area 45 to identify users who have exceeded an expert point threshold for one or more categories. Based on this analysis, in step 725 the system updates the category status for those users—if the user is not already identified as an expert for the one or more categories. Similarly, in step 730 the system analyzes the user profile data in the data storage area 45 to identify users who have exceeded an expert point threshold for one or more geographic regions. Based on this analysis, in step 735 the system updates the region status for those users—if the user is not already identified as an expert for the one or more geographic regions.

Figure 10:
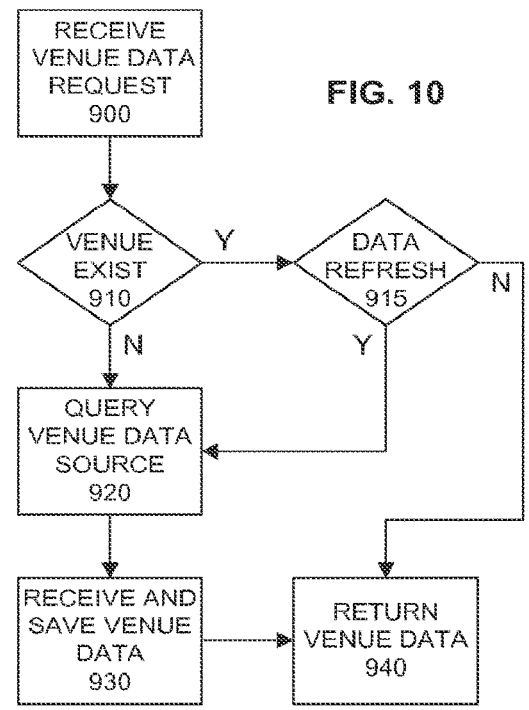
FIG. 10 is a flow diagram illustrating an example process for providing venue data according to an embodiment of the invention.

FIG. 10 is a flow diagram illustrating an example process for providing venue/event data according to an embodiment of the invention. The illustrated process can be carried out by the system previously described with respect to FIGS. 1-3. In one embodiment, venue/event data is stored in data storage area 45. Initially, in step 900 a request for venue/event data is received. Next, the system analyzes its venue/event data to determine in step 910 if relevant venue/event data exists in in the system. If there is no venue/event data, then in step 920 the system queries a venue/event data source to obtain venue/event data. In one embodiment, a venue/event data source may be a third party provider of information about various venues/events and there also may be one or more data sources that provide venue/event information to the system. The venue/event information is then received by the system in step 930 and provided in response to the request in step 940. Advantageously, if venue/event data is received from the data source, the venue/event data is subsequently stored in the data storage area 45. However, if the venue does already exist, as determined in step 910, then in step 915 the system determines if the venue/event information is stale and needs to be refreshed (for example, if the last time the data was updated exceeds a certain threshold). If the venue/event information needs to be refreshed, the system proceeds to step 920 and queries the venue data source for updated information and continues as previously described. If the venue/event information is not stale, as determined in step 915, then in step 940 the system provides the requested venue/event data in response to the request.

As previously discussed with respect to FIGS. 1-3, the communication device 20 has a user interface with which expert users and querying users interact. In one embodiment, the location of a user or a venue/event is overlaid on a map that is displayed on this user interface. A location may represent where a user is currently present, has recently been, or a venue/event that the user is an expert about. Locations are represented by annotations on the map that is displayed on the user interface of the communication device. In order to efficiently display these annotations on the map as the map scale increases (i.e., more land area is represented by the same user interface display area) and the number of annotations increases, the system advantageously clusters the annotations. A cluster represents more than one annotation in a given area that are represented as a single annotation on the user interface. A cluster may also, for example, include a number that represents the number of annotations that are combined in the cluster. For example, a cluster may represent 10 discrete annotations within a given radius on the map being displayed on the user interface.

Figure 11:
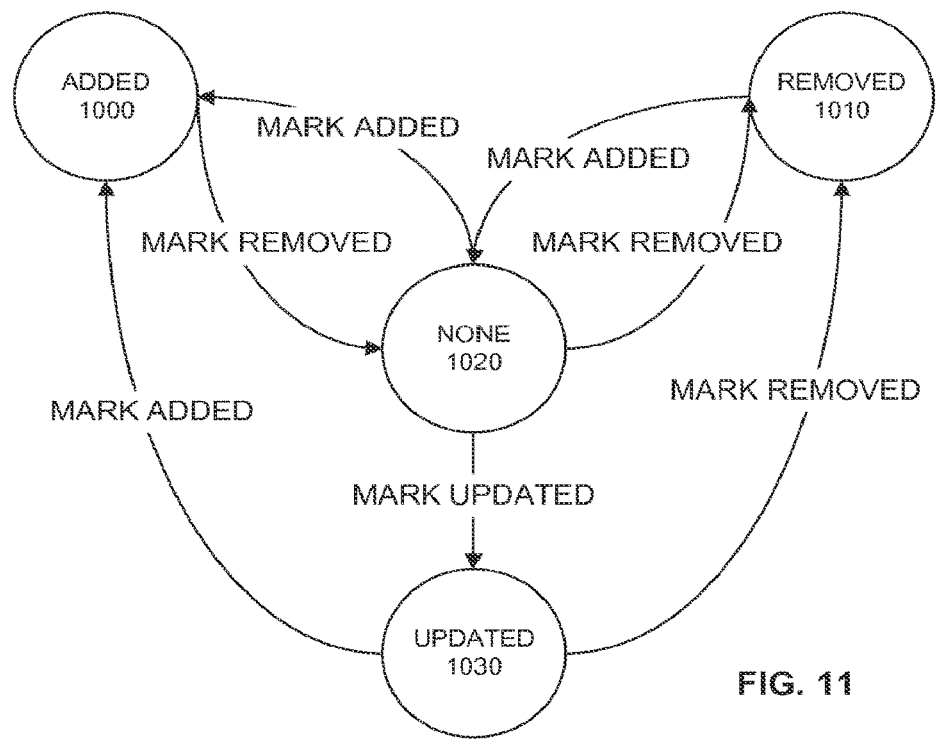
FIG. 11 is a state diagram illustrating an example set of states and transitions for a mutation map according to an embodiment of the invention.

FIG. 11 is a state diagram illustrating an example set of states and transitions for a mutation map according to an embodiment of the invention. In one embodiment, a mutation map is an in-memory hash table that maps annotations to an associated cumulative mutation state. The state of each annotation in the table is updated by following state machine transitions. The mutation map can therefore be used as a transactional queue, allowing the system to track a sequence of individual mutations and aggregate the cumulative effect of operations on each annotation.

In the mutation map, the possible cumulative mutation states are added, removed, updated, and none. If a mapping does not yet exist, the mutation state of the element is none. In the mutation map, the possible state machine transitions are mark added, mark removed and mark updated. In the description that follows, to mark an annotation is understood to mean to follow the associated state machine transition (i.e., to mark an annotation added, we follow the mark added transition).

In the illustrated embodiment, FIG. 11 represents the possible changes that may occur to a mutation map, and the end result of such changes. For example, if marking an annotation as "added" in the mutation map, and its current state is "none" or "updated" the result of the marking is to set the state of the annotation to "added". If marking an annotation as "added" in the mutation map, and its current state is "removed", the result of the marking is to set the state of the annotation to "none". Similarly, if marking an annotation as "removed" in the mutation map, and its state is "none" or "updated" the result of the marking is to set the state of the annotation to "removed". If marking an annotation as "removed" in the mutation map, and its current state is "added" the result of the marking is to set the state of the annotation to "none". If marking an annotation as "updated" in the mutation map, and its state is "none", the result of the marking is to set the state of the annotation to "updated".

In one embodiment, the clustering condition is a predicate satisfied in either of two cases: 1) the count of annotations associated with a geographic cell exceeds the threshold for clustering (e.g., more than four annotations), or 2) there is at least one annotation associated with the geographic cell that forces clustering and the count of annotations associated with the cell is at least two.

In one embodiment, the display screen of a communication device presents a map to the user as part of the user interface. The map is presented at a particular scale and the map contains some portion of the earth. The user interface container that presents a map of a portion of the earth is called the viewport.

In one embodiment, for the purpose of clustering, the earth is divided into a two-dimensional rectilinear grid of square geographic cells such that the width and height of each geographic cell is determined by the scale of the viewport. Geographic cells are numbered starting with zero for north-west cell and incrementing in raster order to the east and to the south.

In one embodiment, the system maintains a hash map that maps annotations to the geographic cells with which they are associated and in which they are displayed. When an annotation is added to a geographic cell, a mapping is added from the annotation to the geographic cell. When the annotation is removed, the mapping is also removed. This is an optimization due to the computational expense of computing the Mercator projection.

FIGS. 12A-C are flow diagrams illustrating example processes for adding an annotation to a map according to an embodiment of the invention. The illustrated processes can be carried out by the system previously described with respect to FIGS. 1-3. Initially, with respect to FIG. 12A, in step 1200, the annotation is marked as "added" in the mutation map. Next, in step 1205 the geographic cells that are associated with the annotation are identified and in step 1210 the annotation is added to the list of annotations associated with the geographic cell. In one embodiment, an annotation can have a set of attributes and if the annotation comprises an attribute that forces clustering, then the counter tracking the number of annotations that force clustering is incremented. If the geographic cell has a cluster, then the condition for clustering (in a previous update) has been met and the annotation is added to the cluster, the cluster is marked as updated (e.g., by following the "mark updated" transition in the mutation map), and the annotation itself is removed (e.g., by following the "mark removed" transition in the mutation map). Finally, in step 1215 the clustering for the cell is updated. If the clustering condition has been met, the cluster is formed (described later with respect to FIG. 14). If the clustering condition has not been met, the cluster is broken (described later with respect to FIG. 15).

FIG. 12B illustrates a process for adding an annotation to a geographic cell. As illustrated in FIG. 12B, the system initially adds the annotation to a list of annotations for the geographic cell in step 1230 and increments the annotation count for the geographic cell in step 1235. If the geographic cell does not already have a cluster, as determined in step 1240 the process ends but if the geographic cell does have a cluster, then the system adds the annotation to the list of annotations for the cluster in step 1245 and marks the cluster updated in step 1250 (e.g., by following the "mark updated" transition in the mutation map). Finally, in step 1255 the annotation is removed (e.g. by following the "mark removed" transition in the mutation map).

FIG. 12C illustrates a process for updating the clustering of a geographic cell after an annotation has been added. As illustrated in FIG. 12C, the system initially determines in step 1270 whether or not the geographic cell has met the condition for clustering annotations. If the requirements/conditions for clustering have not been met, then any existing cluster in that geographic cell is broken up, as shown in step 1275. Similarly, if there is no existing cluster in the geographic cell and the requirements/conditions for clustering have been met in the geographic cell, then any existing annotations are formed into a new cluster as shown in step 1280.

FIGS. 13A-C are flow diagrams illustrating example processes for removing an annotation from a map according to an embodiment of the invention. The illustrated processes can be carried out by the system previously described with respect to FIGS. 1-3. Starting with FIG. 13A, in step 1300 the system finds the geographic cell that contains the annotation to be removed. Next, in step 1305 the annotation is removed from the list of annotations associated with the geographic cell. Next in step 1310, clustering for the geographic cell is updated (e.g., by following the "mark updated" transition in the mutation map) and the annotation is removed (e.g., by following the "mark removed" transition in the mutation map).

FIG. 13B illustrates a process for removing an annotation from a geographic cell. As illustrated in FIG. 13B, the system initially removes the annotation from a list of annotations for the geographic cell in step 1330 and decrements the annotation count for the geographic cell in step 1335. If the geographic cell does not already have a cluster, as determined in step 1340 the process ends but if the geographic cell does have a cluster, then the system removes the annotation from the list of annotations in the cluster in step 1345 and marks the cluster as updated in step 1350 (e.g., by following the "mark updated" transition in the mutation map). Finally, in step 1255 the annotation is added (e.g., by following the "mark removed" transition in the annotation map).

FIG. 13C illustrates a process for updating the clustering of a geographic cell after an annotation has been removed. As illustrated in FIG. 13C, the system initially determines in step 1370 whether or not the geographic cell has met the condition for clustering annotations. If the requirements/conditions for clustering have not been met, then any existing cluster in that geographic cell is broken up, as shown in step 1375. Similarly, if there is no existing cluster already in the geographic cell and the requirements/conditions for clustering have been met in the geographic cell, then any existing annotations are formed into a new cluster as shown in step 1380.

Figure 14:
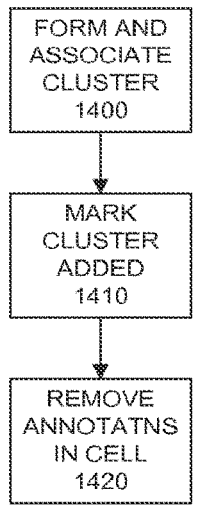
FIG. 14 is a flow diagram illustrating an example process for forming a cluster according to an embodiment of the invention.

FIG. 14 is a flow diagram illustrating an example process for forming a cluster according to an embodiment of the invention. In one embodiment, the illustrated process can be carried out by the system previously described with respect to FIGS. 1-3. Initially, in step 1400 the cluster is formed and associated with a geographic cell. As described above, each geographic cell is associated with a map scale and therefore each cluster is also associated with a map scale by way of being associated with a geographic cell. When forming a cluster, the geographic cell or individual annotations may have an attribute that indicates when to trigger clustering. For example, if an attribute is more than 50% covered when presented on the display in a user interface, then clustering may be triggered. Similarly if the total number of attributes within a single geographic cell exceeds some threshold, then clustering may be triggered. Advantageously, such attributes may vary to allow maximum flexibility and minimum demand on processor resources at both the communication device and the server.

After a cluster has been formed in step 1400, next the cluster is marked as added (e.g., by following the "mark added" transition in the mutation map). The geographic cell is thereafter identified as having at least one cluster. At any time, a single geographic cell can have zero, one, or a plurality of clusters and these clusters may be present in combination with zero, one or a plurality of individual annotations that are not clustered. Once the cluster has been formed and associated with a geographic cell and two or more individual annotations have been associated with the cluster, the two or more associated annotations are removed from the geographic cell (e.g., by following the "mark removed" transition in the mutation map). Removal of the annotations from the geographic cell causes the individual annotations to no longer be presented in the user interface and similarly adding the cluster to the geographic cell causes the cluster to be presented in the user interface. In one embodiment, the number of annotations present in the cluster may be displayed in association with the cluster in the user interface.

Figure 15:
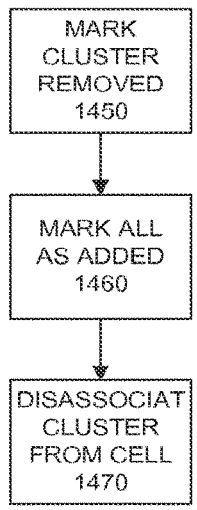
FIG. 15 is a flow diagram illustrating an example process for breaking a cluster according to an embodiment of the invention.

FIG. 15 is a flow diagram illustrating an example process for breaking a cluster according to an embodiment of the invention. In one embodiment, the illustrated process can be carried out by the system previously described with respect to FIGS. 1-3. Initially, in step 1450 the cluster is removed from the geographic cell (e.g., by following the "mark removed" transition in the mutation map). Removal of the cluster causes the cluster to thereafter no longer be presented in the user interface. After a cluster has been removed, in step 1460 each of the annotations that were previously associated with that cluster are marked as added to the geographic cell (e.g., by following the "mark added" transition in the mutation map). This causes the individual annotations to thereafter be presented in the user interface. Once the cluster has been marked as removed and the individual annotations have been marked as added, the cluster is then disassociated from the geographic cell, as shown in step 1470.

With respect to FIGS. 14 and 15, in one embodiment, to compute a final clustering solution, the system does the following: (1) the mutation map is cleared of all state, (2) the system receives input in the form of annotations to be added to or removed from the user interface to be displayed and adds and removes the annotations from the mutation map, (3) the mutation map determines the cumulative effect of the add and remove operations, (4) the state of the mutation map is applied to the user interface such that that all elements in the mutation map that are marked as added are presented on the user interface and all elements that are marked as removed are not presented on the user interface, and all elements that are marked updated are redrawn on the user interface. In this context, an element can be an individual annotation or a cluster.

Furthermore, with respect to adding an removing clusters, a variety of triggers can be employed to determine when to add a cluster and when to remove a cluster. In one embodiment, the scale of the map presented in the user interface can trigger clustering. For example, if three individual annotations are present on the map at a scale of 10:1 (e.g., 10 kilometers on the map to one centimeter on the display of the communication device), then reducing the scale to 20:1 may require clustering of the three discrete annotations. In one embodiment, the percentage of overlap of a first annotation to a second annotation as those annotations are presented in the user interface can trigger clustering. Similarly, if the scale is increased to 5:1, the system may also determine that a cluster can be broken completely or that one or more individual annotations in a cluster can be broken out of the cluster and individually presented in the user interface.

Figure 18:
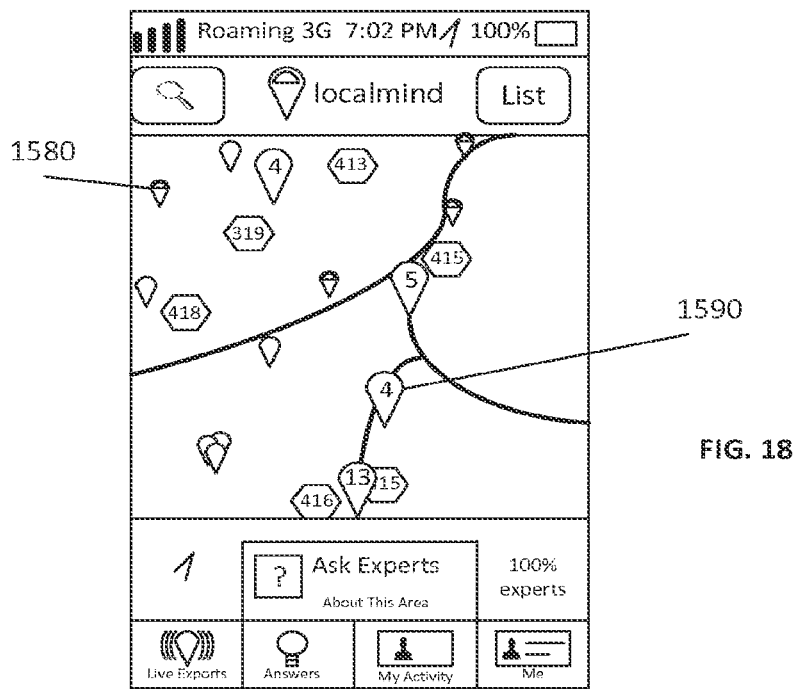
FIG. 18 is a user interface diagram illustrating an example map with clusters according to an embodiment of the invention.

FIG. 18 is a user interface diagram illustrating an example map with clusters according to an embodiment of the invention. In the illustrated embodiment, a map is displayed at a particular scale and a plurality of individual annotations 1580 are presented in the user interface along with a plurality of clusters 1590. As can be seen, the cluster 1590 is presented in association with a count that indicates the number of individual annotations that comprise the cluster.

Figure 19:
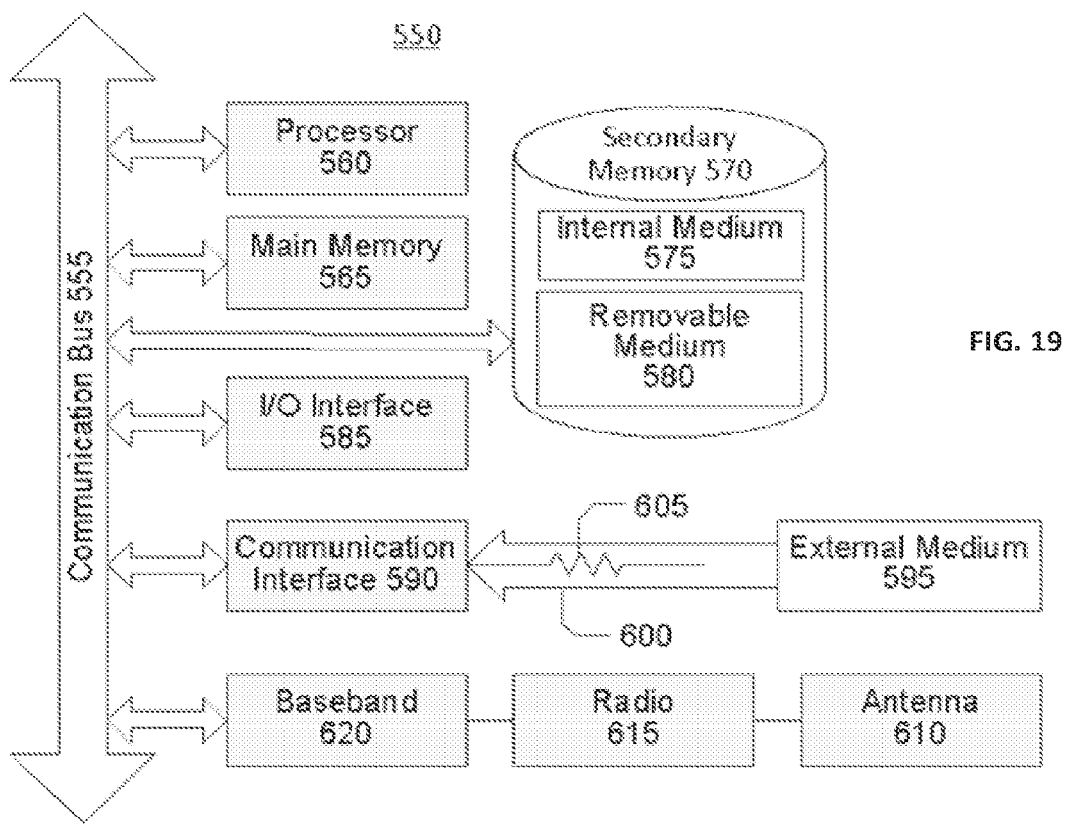
FIG. 19 is a block diagram illustrating an example wired or wireless processor enabled device that may be used in connection with various embodiments described herein.

FIG. 19 is a block diagram illustrating an example wired or wireless processor enabled device that may be used in connection with various embodiments described herein. For example, the device 550 may be used in conjunction with a communication device or server as previously described with respect to FIGS. 1-3. As will be clear to those skilled in the art, alternative processor enabled systems and/or architectures may also be used.

The processor enabled device 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the processor enabled device 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Processor enabled device 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the processor enabled device 550 for execution by the processor 560.

In alternative embodiments, secondary memory 570 may include other similar means for allowing computer programs or other data or instructions to be loaded into the processor enabled device 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the processor enabled device 550.

Processor enabled device 550 may also include a communication interface 590. The communication interface 590 allows software and data to be transferred between processor enabled device 550 and external devices (e.g. printers), networks, or information sources. For example, computer software or executable code may be transferred to processor enabled device 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/ point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication link. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the processor enabled device 550 to perform the various functions of the present invention as previously described.

In this description, the term "computer readable medium" is used to refer to any non-transitory computer readable storage media used to provide computer executable code (e.g., software and computer programs) to the processor enabled device 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the processor enabled device 550.

In an embodiment that is implemented using software, the software may be stored on a computer readable medium and loaded into processor enabled device 550 by way of removable medium 580, I/0 interface 585, or communication interface 590. In such an embodiment, the software is loaded into the processor enabled device 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 620, a radio system 615 and a baseband system 610. In the communication device 550, radio frequency ("RF") signals are transmitted and received over the air by the antenna system 620 under the management of the radio system 615.

In one embodiment, the antenna system 610 may comprise one or more antennae and one or more multiplexors (not shown) that perform a switching function to provide the antenna system 620 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC").

The demodulator and modulator can also be separate components. In the incoming path, the demodulator strips away the RF carrier signal leaving a baseband receive audio signal, which is sent from the radio system 615 to the baseband system 610.

If the received signal contains audio information, then baseband system 610 decodes the signal and converts it to an analog signal. Then the signal is amplified and sent to a speaker. The baseband system 610 also receives analog audio signals from a microphone. These analog audio signals are converted to digital signals and encoded by the baseband system 610. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 620 where the signal is switched to the antenna port for transmission.

The baseband system 610 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the communication device 550 to perform the various functions of the present invention as previously described. For example, data storage areas 565 may include various software modules (not shown) that were previously described with respect to FIGS. 2-3.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for routing electronic communications to computing devices based on real-time GPS location data accessed from an external source, the method comprising:
   continuously receiving, by an online computing system, each time each user, of a plurality of users, checks into a venue or publicly posts a status update from a location, real-time GPS location data from each of a plurality of computing device, each computing device associated with a respective user;
   continuously analyzing the real-time GPS location data to generate, from the real-time GPS location data, a profile for each user, each profile including data comprising specific venues that the user has visited, a number of times the user has visited each specific venue of the specific venues, date, time and duration of each visit to each specific venue, a category of each specific venue, and one or more map scales;
   continuously analyzing the profile data for each user to generate and update a list of users knowledgeable about a first category of venue at a particular map scale, by performing operations comprising:
      assigning points to a user based on a number and frequency of visits to one or more venues in the first category of venue;
      identifying map scales corresponding to the visits to the one or more venues in the first category of venue and assigning points to the user based on the identified map scales corresponding to the particular map scale;
      generating a total score for the user based on the assigned points to the user; and
      adding the user to the list of users knowledgeable upon determining that the total score for the user exceeds a threshold score;
   receiving, by the online computing system, a query from a first computing device;
   routing the query, in real time by the online computing system, to one or more of the plurality of computing devices by performing operations comprising:
      analyzing the query to determine a category of venue associated with the query and map scale based on a scale of map displayed on the first computing device by translating an area of interest shown on the map displayed on the first computing device to a latitude and longitude and a radius for the map scale;
      determining that the category of venue and map scale correspond to the first category at the particular map scale; and
      transmitting, to each computing device associated with each user in the list of users knowledgeable about the first category of venue at the particular map scale, the received query from the first computing device;
   receiving, by the online computing system over a network, a response to the query about the venue from each of the computing devices associated with a subset of users in the list of users;
   causing display, in real time on a user interface of the first computing device, of the response to the query from each of the computing devices associated with the subset of users in the list of users, wherein causing display comprises:
      determining the scale of the map displayed on the first computing device;
      accessing a plurality of annotations associated with coordinates corresponding to the scale of the map;
      determining that first and second annotations of the plurality of annotations overlap each other by a predetermined percentage; and
      in response to determining that first and second annotations of the plurality of annotations overlap each other by the predetermined percentage, combining the first and second annotations into a first cluster, such that the first and second annotations are presented as a single annotation comprising the first cluster on the map displayed on the first computing device; and
   updating, by the online computing system, the total score for each user of the subset of users based on the response received from the computing device associated with each user of the subset of users.

2. The method of claim 1 further comprising:
   updating a venue profile associated with the query based on the response to the query from each of the computing devices associated with the subset of users in the list of users.

3. The method of claim 2 further comprising:
   transmitting a query about a venue associated with the query to a third-party provider of venue information;
   receiving a query response from the third-party provider; and
   updating the venue profile based on the query response.

4. The method of claim 1, further comprising:
determining that third and fourth annotations of the plurality of annotations are currently combined into a second cluster;
determining that respective coordinates of the third and fourth annotations fail to overlap each other by the predetermined percentage; and
in response to determining that the respective coordinates of the third and fourth annotations fail to overlap each other by the predetermined percentage, breaking up the second cluster to individually present the third and fourth annotations as separate annotations on the map.

5. The method of claim 1 comprising verifying that a first user in the list of users knowledgeable about the first category of venue at the particular map scale attended a venue associated with the venue category within a time period.

6. The method of claim 1 comprising verifying at least one of a date and a time that a first user in the list of users knowledgeable about the first category of venue at the particular map scale attended a venue associated with the venue category.

7. The method of claim 1 comprising verifying a duration for which a first user in the list of users knowledgeable about the first category of venue at the particular map scale attended a venue associated with the venue category.

8. The method of claim 1 further comprising analyzing the response to determine one or more categories associated with the response.

9. The method of claim 1 further comprising analyzing the response to determine one or more geographic regions associated with the response.

10. The method of claim 1, further comprising updating a profile for each user of the subset of users to include a respective response to the query.

11. The method of claim 1, causing display of a point total earned for the response to the query on each computing device associated with each of the subset of users.

12. A non-transitory computer-readable storage medium storing computer program instructions executable by a processor of an online computing system to perform operations for routing electronic communications to computing devices based on real-time GPS location data accessed from an external source, the operations comprising:
continuously receiving, each time each user, of a plurality of users, checks into a venue or publicly posts a status update from a location, real-time GPS location data from each of a plurality of computing device, each computing device associated with a respective user;
continuously analyzing the real-time GPS location data to generate, from the real-time GPS location data, a profile for each user, each profile including data comprising specific venues that the user has visited, a number of times the user has visited each specific venue of the specific venues, date, time and duration of each visit to each specific venue, a category of each specific venue, and one or more map scales;
continuously analyzing the profile data for each user to generate and update a list of users knowledgeable about a first category of venue at a particular map scale, by performing operations comprising:
assigning points to a user based on a number and frequency of visits to one or more venues in the first category of venue;
identifying map scales corresponding to the visits to the one or more venues in the first category of venue and assigning points to the user based on the identified map scales corresponding to the particular map scale;
generating a total score for the user based on the assigned points to the user; and
adding the user to the list of users knowledgeable upon determining that the total score for the user exceeds a threshold score;
receiving a query from a first computing device;
routing the query, in real time by the online computing system, to one or more of the plurality of computing devices by performing operations comprising:
analyzing the query to determine a category of venue associated with the query and map scale based on a scale of map displayed on the first computing device by translating an area of interest shown on the map displayed on the first computing device to a latitude and longitude and a radius for the map scale;
determining that the category of venue and map scale correspond to the first category at the particular map scale; and
transmitting, to each computing device associated with each user in the list of users knowledgeable about the first category of venue at the particular map scale, the received query from the first computing device;
receiving, over a network, a response to the query about the venue from each of the computing devices associated with a subset of users in the list of users;
causing display, in real time on a user interface of the first computing device, of the response to the query from each of the computing devices associated with the subset of users in the list of users, wherein causing display comprises:
determining the scale of the map displayed on the first computing device;
accessing a plurality of annotations associated with coordinates corresponding to the scale of the map;
determining that first and second annotations of the plurality of annotations overlap each other by a predetermined percentage; and
in response to determining that first and second annotations of the plurality of annotations overlap each other by the predetermined percentage, combining the first and second annotations into a first cluster, such that the first and second annotations are presented as a single annotation comprising the first cluster on the map displayed on the first computing device; and
updating, by the online computing system, the total score for each user of the subset of users based on the response received from the computing device associated with each user of the subset of users.

13. The computer-readable storage medium of claim 12, the operations further comprising:
updating a venue profile associated with the query based on the response to the query from each of the computing devices associated with the subset of users in the list of users.

14. The computer-readable storage medium of claim 12, the operations further comprising:
transmitting a query about a venue associated with the query to a third-party provider of venue information;
receiving a query response from the third-party provider; and
updating the venue profile based on the query response.

15. The computer-readable storage medium of claim 12, the operations further comprising verifying that a first user in the list of users knowledgeable about the first category of venue at the particular map scale is currently at a venue associated with the venue category.

16. The computer-readable storage medium of claim 12, the operations further comprising verifying that a first user in the list of users knowledgeable about the first category of venue at the particular map scale attended a venue associated with the venue category within a time period.

17. The computer-readable storage medium of claim 12, the operations further comprising verifying at least one of a date that a first user in the list of users knowledgeable about the first category of venue at the particular map scale attended a venue associated with the venue category, a time that the first user attended the venue, and a duration for which the first user attended the venue.

18. The computer-readable storage medium of claim 12, the operations further comprising analyzing the response to determine at least one of a category associated with the response or a geographic region associated with the response.

19. The computer-readable storage medium of claim 12, the operations further comprising updating a profile for each user of the subset of users to include a respective response to the query.

20. An online computing system comprising:
at least one processor; and
a memory coupled with the at least one processor, the memory comprising instructions which, when executed by the processor, cause the system to perform operations for routing electronic communications to computing devices based on real-time GPS location data accessed from an external source, the operations comprising:
continuously receiving, each time each user, of a plurality of users, checks into a venue or publicly posts a status update from a location, real-time GPS location data from each of a plurality of computing device, each computing device associated with a respective user;
continuously analyzing the real-time GPS location data to generate, from the real-time GPS location data, a profile for each user, each profile including data comprising specific venues that the user has visited, a number of times the user has visited each specific venue of the specific venues, date, time and duration of each visit to each specific venue, a category of each specific venue, and one or more map scales;
continuously analyzing the profile data for each user to generate and update a list of users knowledgeable about a first category of venue at a particular map scale, by performing operations comprising:
assigning points to a user based on a number and frequency of visits to one or more venues in the first category of venue;
identifying map scales corresponding to the visits to the one or more venues in the first category of venue and assigning points to the user based on the identified map scales corresponding to the particular map scale;
generating a total score for the user based on the assigned points to the user; and
adding the user to the list of users knowledgeable upon determining that the total score for the user exceeds a threshold score;
receiving a query from a first computing device;
routing the query, in real time by the online computing system, to one or more of the plurality of computing devices by performing operations comprising:
analyzing the query to determine a category of venue associated with the query and map scale based on a scale of map displayed on the first computing device by translating an area of interest shown on the map displayed on the first computing device to a latitude and longitude and a radius for the map scale;
determining that the category of venue and map scale correspond to the first category at the particular map scale; and
transmitting, to each computing device associated with each user in the list of users knowledgeable about the first category of venue at the particular map scale, the received query from the first computing device;
receiving, over a network, a response to the query about the venue from each of the computing devices associated with a subset of users in the list of users;
causing display, in real time on a user interface of the first computing device, of the response to the query from each of the computing devices associated with the subset of users in the list of users, wherein causing display comprises:
determining the scale of the map displayed on the first computing device;
accessing a plurality of annotations associated with coordinates corresponding to the scale of the map,
determining that first and second annotations of the plurality of annotations overlap each other by a predetermined percentage, and
in response to determining that first and second annotations of the plurality of annotations overlap each other by the predetermined percentage, combining the first and second annotations into a first cluster, such that the first and second annotations are presented as a single annotation comprising the first cluster on the map displayed on the first computing device; and
updating, by the online computing system, the total score for each user of the subset of users based on the response received from the computing device associated with each user of the subset of users.

* * * * *